United States Patent [19]

Petersen et al.

[11] 4,002,792
[45] Jan. 11, 1977

[54] IMITATION LEATHER MATERIAL AND METHOD OF PREPARING SUCH MATERIAL

[75] Inventors: Richard E. Petersen, Concord, Mass.; Jitendra J. Modi, North Bergen, N.J.

[73] Assignee: Pandel-Bradford, Inc., Lowell, Mass.

[22] Filed: Dec. 11, 1974

[21] Appl. No.: 531,464

[52] U.S. Cl. .............................. 428/310; 428/315; 428/904

[51] Int. Cl.² .................... B23B 3/26; D06N 3/08

[58] Field of Search ............. 161/159, DIG. 2, 165, 161/160; 428/904, 310, 311, 315

[56] References Cited

UNITED STATES PATENTS

| | | | |
|---|---|---|---|
| 3,607,341 | 9/1971 | Goins | 428/315 |
| 3,649,325 | 3/1972 | Affeldt | 161/160 |
| 3,713,868 | 1/1973 | Gordon et al. | 428/310 |
| 3,751,329 | 8/1973 | Fonzi et al. | 428/904 |
| 3,779,855 | 12/1973 | Fonzi et al. | 428/315 |
| 3,804,700 | 4/1974 | Hoey | 161/160 |
| 3,811,922 | 5/1974 | Clark et al. | 161/159 |

*Primary Examiner*—William J. Van Balen
*Attorney, Agent, or Firm*—Richard P. Crowley

[57] ABSTRACT

An imitation leather material comprising a thin layer of a resin film having a decorative top surface, the film bonded to a fabric base layer through an intervening layer of essentially open-cell, carboxylated, elastomeric-cured foam. The foam layer is prepared with a foamable aqueous latex composition having a pH of about 5.0 to 6.5, a viscosity of from about 5,000 to 30,000 cps, and from about 2 to 10 phr of a free acrylic, acid-containing, partially ammonia-neutralized acrylate polymer.

18 Claims, 2 Drawing Figures

IMITATION LEATHER MATERIAL AND METHOD OF PREPARING SUCH MATERIAL

BACKGROUND OF THE INVENTION

A laminate sheet material suitable for use as imitation leather products in the production of shoes, handbags and the like has been prepared by casting a thin film of a flexible urethane resin polymer onto the surface of a napped and sheared fabric sheet. There are several problems associated with the production and the use of such imitation leather products. First, the fabric which is napped and sheared several times to raise the surface presents a nonuniform surface due to such surface treatment, and, further, is quite expensive and its supply limited. The wear resistance and aesthetic appearance of the imitation leather product containing a thin urethane film often are not satisfactory, since the raised napped and sheared fabric contains surface whiskers which often tend to protrude through the thin resin film, either during production, or particularly when the imitation leather material is placed under pressure in use, such as when used as a shoe upper material.

Various attempts have been made to replace the fabric base with other materials, such as a layer of foam material. Polyvinyl chloride and urethane foams are generally not acceptable for use in shoe upper laminates. The use of latex formulations to form a thin foam layer to date has been unsuccessful, since the latex polymers have often suffered from various degrees of low wall-cell strength, and from mud cracking in the surface during the drying of the wet foam latex layer. Such foamable latex formulations are often prepared employing natural or synthetic elastomeric polymers, together with thickeners, foaming agents, catalysts, fillers, surfactants, curing agents and the like.

One class of foamable latex formulations includes the employing of carboxylated elastomers, such as diene-conjugated elastomers like butadiene-acrylonitrile copolymers. Such formulations also include water-soluble curing agents to effect cross-linking of the wet foam structure on heating, such as by the use of various water-soluble amino resins like melamine-formaldehyde condensates, or other curing compounds. Such cross-linkable latex formulations are set forth, for example, in U.S. Pat. Nos. 2,871,213 and 3,215,647. In order to provide for the preparation of wet foams or the use of the latices, these latex formulations typically include small amounts of silicone-type surfactants to promote small and uniform cell development.

In addition, such latex formulations almost invariably include long-chain fatty acid soaps, particularly ammonium stearate, as a foaming agent, and, in addition, various thickeners are often employed, typically in amounts of less than 1% by weight, in order to adjust and provide the latex formulation with suitable foaming viscosity. Such thickeners include ethyl cellulose, carboxymethyl cellulose, polyvinyl pyrrolidone and various polymers, which are added in small amounts. The latex formulations also often contain various amounts of fillers to reduce the cost and to aid in providing the desired viscosity. These latex formulations are alkaline, and are prepared in foam form by whipping air into the formulation through a mechanical mixing, such as through the technique of employing an Oakes foamer. The typical foamable latex formulations and the uses for which they are employed, such as foam-backed drapery fabrics, are set forth, for example, in U.S. Pat. Nos. 3,231,533; 3,491,033; 3,527,654; 3,598,770; and 3,607,341 and others.

SUMMARY OF THE INVENTION

Our invention relates to improved flexible laminate materials, such as those suitable for use as imitation leather materials particularly for use as shoe upper materials, a method of preparing such materials and foamable latex formulations, and a method of preparing foams from such foamable latex formulations which are useful in our laminate materials. In particular, our invention concerns a soft, flexible, improved, laminate material comprising a thin film of a polymer like a urethane or vinyl resin on the surface thereof, a cured layer of a latex foam, and a fabric sheet material. Our invention also relates to a foamable aqueous latex composition which, prior to foaming, is acidic and only partially neutralized, and which is free of hydrolyzable soap-type foaming agents, and which foam is particularly suitable for use in preparing the flexible laminate materials of our invention.

We have discovered an improved, soft, flexible, laminate material wherein a thin film of a resin is bonded to a cured, dried, latex foam layer on a supporting sheet, such as a fabric base. Our improved laminate material overcomes many of the difficulties associated with past laminate materials, both in the production and use of such materials. Our invention permits the use of relatively inexpensive base sheet materials, rather than the napped and sheared fabrics employed in the past, thereby avoiding the difficulties of surface penetration of the thin film in production and use. In addition and importantly, our invention provides for a new foamable latex formulation which is usefully employed in the preparation of our laminate material, and which latex formulation overcomes many of the difficulties of prior art foamable latex formulations in preparing laminate materials. Our novel and unique latex formulations may be mechanically whipped into a wet foam and subsequently cured to provide, during all stages of the curing and drying steps, foams of good wall cell strength and flexibility, and to provide a foam surface essentially free from mud cracking, and thereby a surface which does not deform the surface of the thin film to which it is to be bonded. Our foamable latex formulations may also be employed in vinyl-type production ovens; that is, where hot air is blown directly downwardly and onto the surface of the wet foam layer; thus, permitting a manufacturer of both vinyl chloride and urethane resin goods to employ the same ovens in the drying and curing of the latex foam formulations.

We have found a unique latex foamable formulation which may be foamed by mechanically whipping into a wet foam and subsequently curing without the need for the typical foaming agents employed in present-day carboxylated latex formulations. Such foaming agents typically employed, such as long-chain fatty acid soaps of sodium potassium ammonium, particularly ammonium stearate, which are necessary foaming aids in prior art foamable latex formulations, must be avoided in our formulations. We have found that in carboxylated foamable latex compositions, the use of ammonium stearate as a foaming agent or other acid hydrolyzable fatty acid foaming agents are not satisfactory, since ammonium stearate and similar ammonium salts, when employed in excess amounts, often migrate to the surface of the foam layer during use. Ammonium stearate on the surface causes such defects as blooming of the surface, and further, reduces the adhesion of the thin resin film to the latex foam surface. Thus, our foamable latex formulation is free of ammonium stearate and similar materials as foaming aids.

In addition, our foamable latex formulations are prepared from only a few ingredients, and do not require, as past foamable carboxylated latex formulations, a silicone-type surfactant in order to promote the uniformity of cell size during the foaming operation. Of course, if desired, small amounts of such prior art silicone surfactants may be employed, but are not essential to our latex formulations. Our latex formulations are at all times maintained acidic in nature during preparation and in use. Although our formulations have a relatively short pot life, the formulations overcome difficulties associated with mud cracking, particularly when a very thin resin film is employed as in our laminate material.

We have discovered that some of the difficulties associated with surface mud cracking of prior art foamable latex formulations are not only associated with the particular formulation, but are also due to the type of drying oven employed in such formulations. Where forced hot air is directed directly onto the wet foam surface from the top of an oven, such as in a vinyl plastisol-type fusing and gelling oven, the impact of the hot air on the top of the latex foam enhances the problem of mud cracking. In such operation, the wet latex foam quickly develops a surface skin, and then as the body of the foam is dried and loses volume, the previously dried surface is unable to stretch or dry at the same rate as the body of the foam layer. Consequently, mud cracking on the surface develops. In the preparation of our imitation leather laminate material, mud cracking is most undesirable, since the foam layer, by being bonded to a very thin layer of resin, on mud cracking, crinkles the thin film, providing surface defects in the laminate material. In any event, mud cracking, whether by the type of drying or by the formulation employed, is most undesirable in the preparation of our improved laminate material, and, consequently, our foamable latex has been compounded to prevent such mud cracking, regardless of the type of drying employed. Our foamable latex composition may be dried, for example, by a countercurrent of warm air, the forced hot air moving generally parallel and countercurrent to the direction of movement of the wet foam layer employed, or a vinyl plastisol-type oven may be employed wherein the forced hot air is directly impinged on the surface of our wet foam formulation.

Our foamable latex composition comprises a cross-linkable natural or synthetic elastomeric polymer, such as a diene-conjugated polymer which is subject to cure, which polymer has contained therein acidic groups, such as carboxylic groups. In particular, our preferred elastomeric polymer is a diene-conjugated carboxylated nitrile polymer, such as an acrylonitrile-butadiene elastomeric copolymer which is subject to cure through cross-linking of its free; e.g., unsaturated carboxylic groups. The elastomeric foam should be such as to produce a soft or flexible cured foam layer. Although our invention will be described in particular as regards butadiene-acrylonitrile copolymer, it is recognized that a wide variety of other elastomeric carboxylated polymers may be employed wherein a diene-conjugated material, such as butadiene, isoprene or other diene-conjugated hydrocarbons, may be copolymerized with other monomers containing, for example, a vinyl group, such as styrene, or with polymerizable nitrile material, such as acrylonitrile or methacrylonitrile, typically with an acidic monomer, such as an acrylic monomer, to introduce acidic carboxylic groups into the copolymer.

Suitable latex formulations include those latex polymeric compositions which are acidic after manufacture, or which can be made acidic without destabilizing or affecting the emulsion properties. Such polymers are typically copolymers which include acrylic groups or which are copolymerized with acrylic monomers, such as acrylic and methacrylic acids and their esters, such as esters with diols and triols and alkyl acrylates and methacrylates. Typical polymeric latices would include diene-acrylate, vinyl halide-acrylate copolymers, such as vinyl chloride-alkyl acrylate; e.g., ethyl acrylate copolymers, as well as water-soluble carboxylated vinyl polymers (such as Carbopol resins of B. F. Goodrich Chemical Co.), and similar carboxylated, methylol curing, long-chain, film-forming organic polymers.

Our foamable latex formulation also includes a curing agent which is adapted on heating to cross-link the carboxylated elastomeric polymer. A wide variety of cross-linking or curing agents may be used, but the preferred material would include methylol-containing agents, such as various aminoplasts or amino resins, such as the water-soluble melamine-formaldehyde condensate resins, which, on heating to a temperature of from about 250° to 375° F, are adapted to cross-link the carboxylated elastomeric polymer. Typically, the water-soluble curing resin or agent is employed in amounts from about 0.5 to 20 phr (parts per hundred parts of resin); for example, from about 2 to 10 phr based on the total solids of the elastomeric polymer employed. The amount of curing agent employed depends on the particular composition of the carboxylated elastomeric polymer, the degree of cross-linking desired, as well as the heating cycle temperature which is to be employed in the curing of the material.

It is essential in our foamable latex formulations that the formulations contain a high amount of a free acid-containing long-chain water-soluble polymeric thickening agent, such as an acrylate resin homopolymer or copolymer, in an amount significantly higher than amounts typically employed in carboxylated latex formulations; that is, higher than the typical thickening amounts. In our preferred embodiment, such acidic-containing polymeric materials would include long-chain polyacrylic or methacrylic acids and their partially neutralized salts which are hydrolyzed in an acidic solution, such as alkali metal salts like sodium, potassium and ammonium salts thereof. The free acid-containing polymers employed must be such as to provide for thickening of our latex composition on partial neutralization of the free acid-containing materials through the addition of the alkaline material, such as a volatile nitrogen-alkaline agent like ammonia. One suitable class of materials particularly useful in our foamable latex composition would comprise acrylate resins containing, for example, from about 20 to 80% of acrylic or methacrylic acid or combinations thereof in a copolymer; for example, with an alkyl acrylate or methacrylate, such as ethyl acrylate.

A number of such acrylic polymeric materials are sold and commercially marketed as a partially cross-linked acrylic emulsion copolymer or homopolymer in aqueous compositions on the acidic side. Such materials are often supplied as a stable ltex emulsion with a viscosity like that of water; that is, typically a low viscosity of less than 1,000 cps, which materials, on the addition of an inexpensive heat-volatile agent like ammonia, result in the neutralization of all or a part of the acidic groups in the formation of a highly viscous solution which becomes an effective thickener for many aqueous systems. In such particular materials, the maximum thickening effect is obtained when the acidic groups are completely neutralized, which usually corresponds to a pH value of about 7.5 to 8.5, and, thus, minor amounts of the materials have in the past typically been employed, such as in amounts of less than 1%.

We have discovered that the employment of such free acidic thickening agents in higher-than-usual amounts, typically ranging, for example, from 2 to 10 phr; e.g., 3 to 6 phr, is essential in the practice of our invention. The amount employed must be sufficient so that, on only partial neutralization thereof and on the acidic side, the latex formulation will obtain a foamable viscosity. For this purpose, of course, we have found that a partially cross-linked ethylacrylate with methacrylic acid or acrylic acid wherein the alkylacrylate ranges from about 20 to 80%, or typically 50 to 65% of the copolymer, is effective. Long-chain polyacrylate polymers also may be employed. However, in the selection of a particular material to be employed, such material must be capable of only partial neutralization with ammonia to provide the desired viscosity, and also after such partial neutralization, still be on the acidic side so that the latex formulation has a pH of approximately 5.0 to 6.5. We have found that such free acid-containing acrylate polymers provide a multicomponent function, acting as a thickening agent when partially neutralized and still on the acidic side, while the acidic groups present in the latex formulation act as an aid in the curing catalyst, while the partially neutralized groups not only provide for thickening, but also serve as a foaming agent. On heating during the curing step, the ammonia is driven off and the acrylic groups then are compatible with the polymer and cross-link with and become a part of the polymer.

Although not wishing to be bound by any particular theory or hypothesis regarding the operation of our invention, we believe that the partial neutralization of an alkaline agent, particularly ammonia, and of the free acidic groups of the long-chain acrylate thickener material, avoids the necessity of employing an ammonium stearate as a foaming agent. Ammonium stearate or similar materials on the acidic side would hydrolyze, and the stearic acid would precipitate and would not participate in the cross-linking or curing reactions, while the use of a compatible acrylic polymer provides an acidic group to aid in the curing step and help to catalyze the reaction with the methylol when the ammonia is driven off. Since the formulation is on the acidic side at all times, the partially neutralized groups of the acrylate polymer permit a stable foamable latex of the desired viscosity through partial neutralization, while the long-chain polymer permits good cell-wall strength during the drying and curing stages of the foam, while inhibiting the formation of surface skin during drying which leads to mud cracking. The ammonia-neutralized acrylic groups, such as ammonium acrylate groups where ammonium is employed, are believed to provide for a foaming agent in place of the migrating ammonium stearate. The unneutralized poly-acrylic acid groups provide strength to the cell wall of the primary elastomeric polymer which prevents the collapse during the drying and curing stages. Thus, our free acid-containing acrylate polymer must be employed in substantial higher amounts than would normally be employed in latex formulations where it is used solely as a thickening agent and is fully neutralized and placed on the alkaline side. On the addition of our acrylate polymer, our foamable aqueous latex formulation has an acidic pH typically of less than 7.0; for example, from about 5.0 to 6.5, and more particularly 6.0 to 6.5 just prior to foaming.

Our latex formulations may, if desired, contain various amounts of other additives which are typically employed in latex formulations. However, due to the acidic nature of the latex, hydrolyzable soap prior art foaming agents, such as ammonium stearate, cannot be employed, since such materials would only hydrolyze in the acid-containing formulation. If desired, small amounts of silicone-type surfactants to aid cell control may be used, but are not essential. Other additives which may be employed if desired include thickeners, stabilizers, antioxidants, plasticizers, surfactants, modifiers, catalysts, othr copolymers, resins and the like, alone or in combination. Typically if desired, various amounts of filler materials, such as clay, talc, diatomaceous earth, calcium, carbonate, carbon black, fibers and other natural or synthetic inert filler materials, may be employed to reduce the cost and provide volume or other desirable properties to the latex foam. However, in the preparation of our improved laminate materials, typically the amount of filler material employed should range from 0 to not over 50 phr, and more particularly, from about 5 to 25 phr, since large amounts of thickeners have a tendency to reduce the strength of the resulting foam and to impart undesirable rigidity thereto.

In use, the ingredients of our latex formulations are admixed together as desired, and then alkaline material is slowly added with mixing to the latex formulation to provide a foaming viscosity, such as 5000 to 30,000 cps; e.g., of over 10,000 cps; for example, 15,000 to 25,000 cps, and more particularly, 20,000 to 30,000 cps (Brookfield viscometer speed 20, spindle No. 6). The viscosity adjustment is made through the addition of a base alkaline material, such as an alkaline amine and the like, with the preferred material for adjusting viscosity being ammonia. Sufficient ammonia is added to obtain the desired viscosity, but insufficient to neutralize the latex formulation and a substantial part of the acid-containing water-soluble polymeric thickener material present. Thus, sufficient acrylate polymeric material must be present to permit the adjustment of viscosity, and yet to leave the latex formulation always on the acid side. Since the thickened carboxylated latex formulation is on the acid side, it has a short pot life, and should be employed soon after the adjustment of the viscosity.

The viscosity-adjusted latex formulation is subsequently foamed into a wet foam layer, such as mechanical whipping of the acidic foamable latex formulation through the use of an Oakes foamer or the like to provide a wet latex foam. The wet latex foam may be useful in the preparation of our laminate material, and may then be coated onto any desired surface, and then heated to cure and dry the foam.

Where our latex foam material is employed in the preparation of our improved laminate material, wet latex foam is typically coated e.g., 5 to 30 mils in thickness onto the back surface of the thin resin film; such as a flexible urethane or vinyl-chloride-type polymer employing a knife or bar coating or other coating means, or if desired alternately, the latex wet foam may be coated on a transfer paper, and the thin polymeric film placed on top of the wet surface.

In the preparation of our improved flexible laminate material, the foamable latex formulation, after adjustment of the viscosity on the acidic side, is then beaten into a wet foam, and the wet foam deposited onto the back surface of a thin polymeric film having a surface design on the front surface, the film supported on a transfer sheet. The foam layer is coated on at a thickness of from about 5 to 20 mils in thickness or more as desired where a transfer sheet is employed to aid in supporting the thin resin film. The transfer paper has a surface thereon so that it may be stripped from the front surface of the film after preparation of the laminate. An inexpensive sheet material, such as a paper or fabric woven cotton sheet material, is then placed on top of the wet foam layer which forms a base for the laminate material. The laminate material so prepared is then passed through one or a series of heating zones, for example hotair ovens which may or may not be supplemented by the use of infrared heaters, wherein the laminate is heated to a temperature sufficient to induce cross-linking of the carboxylated elastomeric polymer by the curing agent. Temperatures which may be employed in the oven may range from 250° to 500° F; for example, 275 to 400° F. The foam density of the latex foam when wet may vary as desired, but often ranges from about 35 to 50 pcf (pounds per cubic feet); for example, 40 to 45 pcf, which often provides a dry foam density of 35 to 50 pcf. The laminate material so prepared, therefore, provides an intervening cured, dried, flexible, elastomeric typically substantially open-cell foam layer bonding the thin film to the inexpensive fabric base. The improved laminate may then be employed on handbags, ladies' shoes and the like.

Our invention will now be described for the purpose of illustration only in connection with the preparation of an imitation leather urethane film resin product employing specific formulations. However, it is recognized that our latex formulation may be employed in latex foams per se, as well as for use in preparing other laminate-type materials.

DESCRIPTION OF THE EMBODIMENTS

Example 1

Figure 1:
FIG. 1 is a schematic cross-sectional view of an imitation leather material of our invention.

A foamable latex composition of our invention was prepared by admixing the following components:

| INGREDIENTS | WEIGHT BY PARTS |
| --- | --- |
| 1. Hycar 1572 × 45 latex, a carboxylated acrylonitrile-butadiene emulsion copolymer from B. F. Goodrich Co. | 100 |
| 2. Alcogum, a cross-linked ethylacrylate-methacrylate acid of about 60% ethylacrylate and 40% methacrylate acid from | |

-continued

| INGREDIENTS | WEIGHT BY PARTS |
| --- | --- |
| Alco Chemical Corp. | 4.2 |
| 3. Cyrez latex curing resin, a water-soluble melamine-formaldehyde condensate from American Cyanamide Company | 17.2 |

The above ingredients were mixed, and after mixing, had an acidic pH of less than about 6.0. Ammonia was slowly added to adjust the viscosity of the above mixture to about 15,000 to 20,000 cps. The ammonia partially neutralized the acidic thickener, and the aqueous latex formulation had a pH of from about 6.0 to about 6.5. The pH of the formulation remained essentially constant on the acidic side even with the addition of the ammonia due to the buffering action of the thickener.

Example 2

A prior art latex formulation particularly useful in preparing a wet foam layer was then prepared having the following ingredients:

| INGREDIENTS | WEIGHT BY PARTS |
| --- | --- |
| 1. Hycar 1572 × 45 latex, a carboxylated acrylonitrile-butadiene emulsion copolymer from B. F. Goodrich Co. | 100 |
| 2. Sodium lauryl sulfate, a surfactant agent | 1 |
| 3. Cymel 303 latex curing agent, a hexamethoxymethyl melamine condensate from American Cyanamide Corp. | 5 |
| 4. Paratoluene sulfonic acid, an acid catalyst | 1 |
| 5. Ammonium hydroxide (28%) | — |
| 6. Ammonium stearate as a foaming agent | 4 |
| 7. Thickening agent - ASE 95, a polyacrylate polymer from Rohm & Haas Co. | 1 |

The ingredients were mixed in the order of Nos. 1, 2, 3 and 4, then ammonium hyroxide was added to adjust the pH to the alkaline side. Ammonium stearate (No. 6) and the thickener (No. 7) were then added to the formulation readjusted with ammonium hydroxide to a pH of 8.8 and a viscosity of about 9,000 cps. The resulting formulation was stable in storage, while the acidic formulation of Example 1 was stable; e.g., 2 hours to 2 days, depending on temperature.

Our latex formulation of Example 1 and the prior art latex formulation of Example 2 were then foamed by mechanically beating air into the latex formulation to provide a wet foam having a density of from about 40 to 45 pcf. The foam was then coated onto the back surface of a thin layer of about 0.3 to 2.0 mils of a flexible urethane resin film employing a knife or bar coater. The wet foam layer had a depth of about 2 to 20 mils in thickness. A woven cotton fabric was then placed on the wet foam surface, and the laminate so prepared placed in an oven for about 1 to 3 minutes at an oven temperature of from about 250° to 275° F, first to gel, and then, at an oven temperature of from about 257° to 375° F, to cross-link the carboxylated butadiene-acrylonitrile copolymer in the foam layer. The foam layer was bonded to the fabric base at a foam density of about 45 to 50 pcf. The exposed top surface of the urethane film was then visually examined for defects. The cured foam layer represented by Example 2 of the formulation was not satisfactory in that the thin urethane film at the intervening foam layer had exhibited mud cracking on the body of the foam surface through the crinkling of a thin urethane film, blooming and poor adhesion to the thin layer. The improved laminate material prepared by our latex formulation was satisfactory as an imitation leather material and exhibited no crinkling of the thin film layer due to mud cracking, and was suitable for use as a shoe upper material.

Further, in additional experiments, similar latex formulations were prepared with the use of similar amounts of acrysol ASE-60, an acid-containing cross-linked polyacrylic 28% emulsion copolymer of Rohm & Haas Company. Wet foam layers employing such latex formulations were examined on the exposed surface for mud cracking and other defects, and it was found that such particular material had a relatively smooth latex surface in comparison to a mud-cracked-type surface as prepared by the prior art latex formulations. Furthermore, in additional testing in a vinyl-type plastisol production oven, hot air was impinged directly onto the surface, and the prior art latex formulation exhibited mud cracking on the surface and a deficient latex foam structure, while the foam layer prepared through the use of our latex formulation exhibited significantly less mud cracking on the surface, and tended to show good cellular foam structure and surface characteristics.

Typically, the thin polymer films which may be employed in connection with our improved laminate include not only those flexible thin urethane resin films, but also plasticized vinyl halide resins, such as polyvinyl chloride resins and other thin thermoplastic-type polymers, which may be embossed or unembossed as desired. The thin polymeric material did not show any defects in the underlying foam layer. Our improved laminate structure overcomes the difficulties associated with the uneven surface and whisker-containing surface of the expensive sheared napped fabrics. The dried cured foam layer produced was essentially an open-cell layer which is breathable in nature and more flexible and resilient.

FIG. 1 illustrates an improved laminate material 10 of our invention which comprises a very thin film layer 12 having an imitation leather surface design, such as an embossed design on the surface thereof, such as a embossed urethane resin layer, the film layer 12 securely bonded to an intervening essentially open-cell acrylate-flexible elastomeric polymer cured foam layer 14, which layer is also bonded on the opposite side to an inexpensive woven cotton fabric base material 16.

Figure 2:
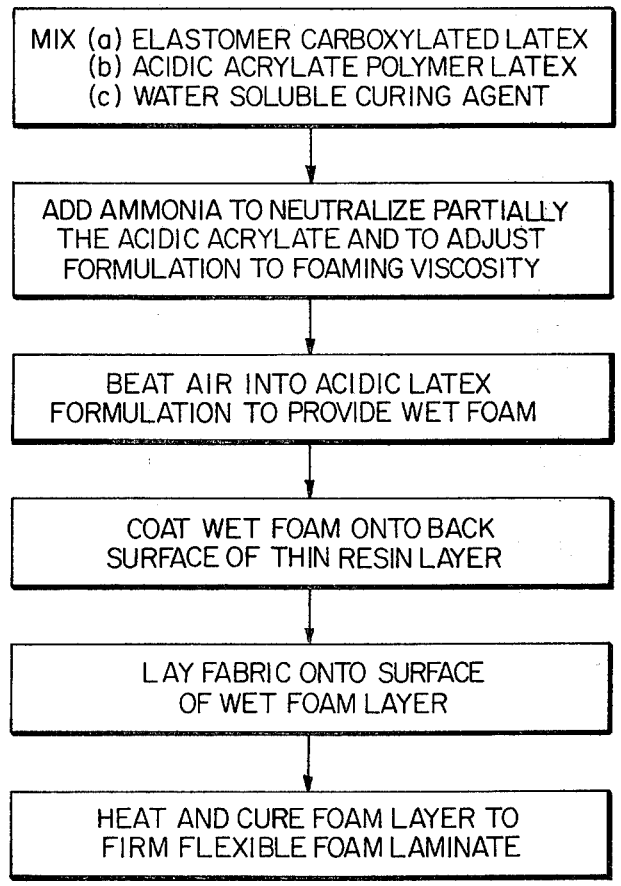
FIG. 2 is a schematic process flow diagram of the process of preparing the laminate material of FIG. 1.

FIG. 2 is a schematic illustration of the process of preparing our improved laminate material of FIG. 1, which sets forth the various steps as illustrated more particularly heretofore in preparing our improved laminate material. In our invention, it is essential that the latex formulation employed be acidic throughout its preparation and use. The acrylate polymeric material employed contains free acid groups which are subject to partial neutralization to provide the desired thickening, and must be used in an amount significantly greater than the amount previously employed in latex polymers. We have found that if only very minor quantities of the acrylate thickener material are employed as in past materials, the benefits of our latex formulation and technique are not obtained. Furthermore, our latex formulation is free of hydrolyzable soap material, since such soap material, like ammonium stearate, with the latex formulation on the acid side would hydrolyze, precipitate the acid and be ineffective. Thus, we have provided for a foamable latex formulation which is free of such soap materials. Our latex formulation and the improved laminate material prepared therewith avoid many of the problems of the prior art, both as to latex formulations and as to the improved laminate material.

Our invention has been described in particular in connection with the preparation of a particular imitation leather laminate material; however, it is fully recognized that our foamable latex formulation and its preparation and use may be employed in the coating of other sheet materials, in the preparation of other foams or other laminates containing foams wherein our latex formulation may be usefully employed. Our formulation may be usefully employed where it is desired to avoid mud cracking effects of the foam layer where the use of foaming agents, such as ammonium stearate, or other soaps, is or might be detrimental to the performance or appearance of the article being prepared.

What we claim is:
1. A sheet laminate material suitable for use as a shoe-upper material, which laminate material comprises:
  a. a thin, flexible, organic, polymer, top skin layer;
  b. a flexible supporting fabric material; and
  c. a foam layer intervening between and bonded to the top skin layer and the fabric layer, which foam layer comprises a resilient, flexible, substantially open-cell, polymeric foam layer having a thickness of from about 5 to about 30 mils, and which foam layer has been derived from a latex composition which consists essentially of
    i. a film-forming, organic, cross-linkable, carboxylated polymer,
    ii. a water-soluble, long-chain, free, acidcontaining, partially neutralized, acrylate polymer in a thickening amount of from about 2 to 10 phr,
    iii. a methylol cross-linking agent in an amount sufficient to cross-link the organic film-forming carboxylated polymer and the acidic acrylate polymer, and
    iv. the latex composition having an acidic pH and a foamable viscosity.
2. The laminate of claim 1 wherein the polymer of the top skin layer comprises a flexible urethane polymer or a vinyl-halide.
3. The laminate of claim 1 wherein the surface of the top skin layer is thermoplastic polymer characterized by an embossed surface design thereon.
4. The laminate of claim 1 wherein the supporting sheet fabric material comprises a woven fabric sheet material.
5. The laminate of claim 1 wherein the organic film-forming carboxylated polymer comprises a carboxylated diene-nitrile copolymer, a diene-nitrile-acrylate copolymer, a diene-acrylate copolymer, a carboxylated vinyl polymer or a vinyl-halide-acrylate copolymer.
6. The laminate of claim 1 wherein the organic film-forming carboxylated polymer is a water-soluble carboxylated vinyl-chloride-alkyl-acrylate copolymer, or a carboxylated butadiene-acrylontrile polymer.

7. The laminate of claim 1 wherein the crosslinking agent comprises a water-soluble methylol aminoplast resin in an amount of from about 0.5 to 20 phr.

8. The laminate of claim 1 wherein the latex composition contains a silicone fluid cell-control agent.

9. The laminate of claim 1 wherein the latex composition contains from about 0 to 50 phr of particulate filler material.

10. The laminate of claim 1 wherein the foam layer has a dry foam density of from about 35 to 50 pcf.

11. The laminate of claim 1 wherein the acrylate polymer is a copolymer of an alkyl acrylate with from about 20 to 80% of an acrylic or methacrylic acid.

12. The laminate of claim 11 wherein the alkyl acrylate is ethyl acrylate.

13. The laminate of claim 1 wherein the cross-linking agent is a water-soluble melamine-formaldehyde condensate.

14. The laminate of claim 1 wherein the top skin layer has a thickness of from about 0.5 to 2.0 mils.

15. The laminate of claim 1 wherein the latex composition has a foaming viscosity of from about 5000 to 30,000 cps.

16. The laminate of claim 1 wherein the acrylate polymer is partially neutralized by ammonia.

17. The laminate of claim 1 wherein the latex composition has a pH of from about 5.0 to about 6.5.

18. A sheet laminate material suitable for use as a shoe-upper material, which laminate comprises:
 a. a thin, flexible, organic, polymer, top skin layer comprising a urethane or a plasticized vinyl-halide resin, and having a thickness of from about 0.5 to 2.0 mils, the top skin layer characterized by a surface design thereon;
 b. a flexible, supporting, woven, sheet fabric material;
 c. a foam layer intervening between and bonded to the top skin layer and the fabric material, which foam layer comprises a resilient, flexible, substantially open-cell polymeric foam layer having a thickness of from about 5 to 30 mils, and which foam layer has been obtained by frothing and heating a latex composition which consists essentially of
  i. a cross-linkable, carboxylated, diene-nitrile, elastomeric, film-forming, organic polymer,
  ii. a water-soluble, long-chain, free acidcontaining, partially ammonia-neutralized, acrylate polymer in an amount of from about 2 to 10 phr,
  iii. a water-soluble, methylol, aminoplast resin as a cross-linking agent to cross-link the film-forming polymer and the acrylate polymer, said cross-linking agent present in an amount of from about 0.5 to 20 phr, and
  iv. the latex composition having an acidic pH of from about 5.0 to about 6.5.

* * * * *